United States Patent
Sakamoto et al.

(10) Patent No.: US 6,707,178 B2
(45) Date of Patent: Mar. 16, 2004

(54) PERMANENT MAGNET TYPE TWELVE-POLE STEPPING MOTOR

(75) Inventors: Masafumi Sakamoto, Kiryu (JP); Noriyoshi Kikuchi, Ashikaga (JP); Toru Kobayashi, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 0 days.

(21) Appl. No.: 09/999,340

(22) Filed: Dec. 3, 2001

(65) Prior Publication Data

US 2002/0079750 A1 Jun. 27, 2002

(30) Foreign Application Priority Data

Dec. 22, 2000 (JP) ........................ 2000-390364
Nov. 7, 2001 (JP) ........................ 2001-341878

(51) Int. Cl.[7] .................... H02K 7/00; H02K 11/00
(52) U.S. Cl. .................. 310/49 R; 310/156.38; 310/156.43; 310/156.45
(58) Field of Search ............... 310/49 R, 156.38, 310/156.43, 156.45

(56) References Cited

U.S. PATENT DOCUMENTS

| | | | |
|---|---|---|---|
| 4,983,867 A | 1/1991 | Sakamoto | 310/49 R |
| 5,128,570 A | 7/1992 | Isozaki | 310/49 R |
| 5,289,064 A | 2/1994 | Sakamoto | 310/49 R |
| 5,386,161 A | 1/1995 | Sakamoto | 310/49 R |
| 5,708,310 A * | 1/1998 | Sakamoto et al. | 310/49 R |
| 5,723,931 A * | 3/1998 | Andrey | 310/179 |
| 5,854,526 A | 12/1998 | Sakamoto | 310/254 |
| 5,874,795 A | 2/1999 | Sakamoto | 310/156 |
| 6,153,953 A | 11/2000 | Isozaki et al. | 310/49 R |
| 6,160,330 A | 12/2000 | Sakamoto | 310/49 R |
| 6,259,176 B1 | 7/2001 | Isozaki et al. | 310/49 R |

OTHER PUBLICATIONS

U.S. patent application Ser. No. 09/725,310, filed Nov. 29, 2000, allowed.
U.S. patent application Ser. No. 10/171,624, filed Jun. 17, 2002, pending.

* cited by examiner

Primary Examiner—Nicholas Ponomarenko
Assistant Examiner—J. Aguirrechea
(74) Attorney, Agent, or Firm—Oblon, Spivak, McClelland, Maier & Neustadt, P.C.

(57) ABSTRACT

A stator of the stepping motor of the invention includes an annular shaped yoke portion, a stator iron-core having twelve stator main poles each having a plurality of small teeth on the tip end thereof and stator coils wound in the stator iron-core as three-phase winding. The stator rotatably supports a hybrid type rotor having a cylindrical permanent magnet that is sandwiched between a pair of rotors each having pole teeth around the circumferential surface to be opposite to the small teeth. Second, third, fourth and fifth harmonic components are removed by composing cogging torque of the respective phases by means of the three-phase twelve-pole construction. Any one harmonic component of the cogging torque among the second to fifth harmonic components is independently erased by making a difference between the small teeth pitch and the rotor teeth pitch, thereby the selected harmonic component is doubly erased.

10 Claims, 4 Drawing Sheets

FIG. 4

| $-P_{D1}$ | n=1 | n=2 | n=3 | n=4 | n=5 | n=6 |
|---|---|---|---|---|---|---|
| A | $K_1\sin(Nr\theta)$ | $2K_2\sin 2(Nr\theta)$ | $3K_3\sin 3(Nr\theta)$ | $4K_4\sin 4(Nr\theta)$ | $5K_5\sin 5(Nr\theta)$ | $6K_6\sin 6(Nr\theta)$ |
| B | $K_1\sin(Nr\theta+2\pi/3)$ | $2K_2\sin 2(Nr\theta+2\pi/3)$ | $3K_3\sin 3(Nr\theta+2\pi/3)$ | $4K_4\sin 4(Nr\theta+2\pi/3)$ | $5K_5\sin 5(Nr\theta+2\pi/3)$ | $6K_6\sin 6(Nr\theta+2\pi/3)$ |
| C | $K_1\sin(Nr\theta+4\pi/3)$ | $2K_2\sin 2(Nr\theta+4\pi/3)$ | $3K_3\sin 3(Nr\theta+4\pi/3)$ | $4K_4\sin 4(Nr\theta+4\pi/3)$ | $5K_5\sin 5(Nr\theta+4\pi/3)$ | $6K_6\sin 6(Nr\theta+4\pi/3)$ |
| D | $K_1\sin(Nr\theta+\pi)$ | $2K_2\sin 2(Nr\theta+\pi)$ | $3K_3\sin 3(Nr\theta+\pi)$ | $4K_4\sin 4(Nr\theta+\pi)$ | $5K_5\sin 5(Nr\theta+\pi)$ | $6K_6\sin 6(Nr\theta+\pi)$ |
| E | $K_1\sin(Nr\theta+2\pi/3+\pi)$ | $2K_2\sin 2(Nr\theta+2\pi/3+\pi)$ | $3K_3\sin 3(Nr\theta+2\pi/3+\pi)$ | $4K_4\sin 4(Nr\theta+2\pi/3+\pi)$ | $5K_5\sin 5(Nr\theta+2\pi/3+\pi)$ | $6K_6\sin 6(Nr\theta+2\pi/3+\pi)$ |
| F | $K_1\sin(Nr\theta+4\pi/3+\pi)$ | $2K_2\sin 2(Nr\theta+4\pi/3+\pi)$ | $3K_3\sin 3(Nr\theta+4\pi/3+\pi)$ | $4K_4\sin 4(Nr\theta+4\pi/3+\pi)$ | $5K_5\sin 5(Nr\theta+4\pi/3+\pi)$ | $6K_6\sin 6(Nr\theta+4\pi/3+\pi)$ |
| Σ | 0 | 0 | 0 | 0 | 0 | $36K_6\sin 6(Nr\theta)$ |

PERMANENT MAGNET TYPE TWELVE-POLE STEPPING MOTOR

BACKGROUND OF THE INVENTION

1. Field of the Invention

The present invention relates to an improvement of a permanent magnet type three-phase twelve-pole stepping motor that is employed in OA equipment such as a copier, a scanner g or the like.

2. Description of Prior Arts

A pitch of stator teeth of a conventional three-phase twelve-pole permanent magnet type stepping motor is equal to a pitch of rotor teeth, and three phases, which are U-phase, V-phase and W-phase, are spatially distributed at 120 degrees intervals. Further, since a hybrid type rotor has 180 degrees of phase difference among the magnet poles, a N-pole and a S-pole, the fourth harmonic component is erased in a space of a field magnet of an air gap among the phases.

In this case, although the fourth harmonic component forms a cogging torque in the space of the field magnet of the air gap, the cogging torque of the conventional three-phase hybrid type stepping motor becomes minimum according to the above-described effect.

Incidentally, in the above-described conventional construction, the fourth harmonic component included in the magnetic flux in the field magnet formed in the air gap takes small value when the pole pair number Nr of the rotor becomes large, because the phase between the N-pole and the S-pole formed on the rotor equals to (180/Nr) degrees in a mechanical angle. Accordingly, since a slight error of the mechanical angle results in a large error of the electrical angle, the fourth harmonic component of the field magnet formed among the phases cannot be erased.

Therefore, the values of the cogging torque vary and there may be a product having a part of large cogging torque, which results the variation in an oscillation noise. Further, the effect of the harmonic components is the same when the second harmonic component, the third harmonic component and the fifth harmonic component exist, and therefore, these harmonic components are required to be removed.

An object of the present invention is to provide a permanent magnet type twelve-pole stepping motor that eliminates the defects mentioned above.

SUMMARY OF THE INVENTION

A permanent magnet type twelve-pole stepping motor of an inner rotor type described in claim 1 comprises, a stator comprising a yoke portion having approximately annular shape, a stator iron-core made from magnetic material having twelve stator main poles that are directed from the inner circumferential surface of the yoke portion toward the center and each having a plurality of small teeth on the tip end thereof, and stator coils wound in the stator iron-core;

a so-called hybrid type rotor, which is rotatably supported by the stator through a predetermined air gap, having a cylindrical permanent magnet magnetized in a rotation axis direction that is sandwiched between a pair of rotors made from magnetic material each having Nr pieces of pole teeth around the outer circumferential surface thereof at equal pitch and the rotors being arranged such that the pole teeth are deviated with each other, or a permanent magnet type rotor whose cylindrical outer circumferential surface is magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of the respective phases by means of the three-phase twelve-pole construction, further any one harmonic component of the cogging torque among the second harmonic component, the third harmonic component, the fourth harmonic component and the fifth harmonic component is independently erased by making a difference between the small teeth pitch of said stator main pole and the rotor teeth pitch or the pole pair number pitch, thereby any one harmonic component among the second harmonic component, the third harmonic component, the fourth harmonic component and the fifth harmonic component is doubly erased.

Further, a permanent magnet type twelve-pole stepping motor of an outer rotor type described in claim 2 comprises, a stator comprising a yoke portion having approximately annular shape, a stator iron-core made from magnetic material having twelve stator main poles that are formed on the outer circumferential surface of the yoke portion aligned radially and each having a plurality of small teeth on the tip end thereof, and stator coils wound in the stator iron-core;

a so-called hybrid type rotor, which is rotatably supported by the stator through a predetermined air gap, having a cylindrical permanent magnet magnetized in a rotation axis direction that is sandwiched between a pair of rotors made from magnetic material each having Nr pieces of pole teeth around the inner circumferential surface thereof at equal pitch and the rotors being arranged such that the pole teeth are deviated with each other, or a permanent magnet type rotor whose cylindrical inner circumferential surface is magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of the respective phases by means of the three-phase twelve-pole construction, further any one harmonic component of the cogging torque among the second harmonic component, the third harmonic component, the fourth harmonic component and the fifth harmonic component is independently erased by making a difference between the small teeth pitch of said stator main pole and the rotor teeth pitch or the pole pair number pitch, thereby any one harmonic component among the second harmonic component, the third harmonic component, the fourth harmonic component and the fifth harmonic component is doubly erased.

Further, a permanent magnet type twelve-pole stepping motor of an inner rotor type described in claim 3 comprises, a stator comprising a yoke portion having approximately annular shape, a stator iron-core made from magnetic material having twelve stator main poles that are directed from the inner circumferential surface of the yoke portion toward the center and each having a plurality of small teeth on the tip end thereof, and stator coils wound in the stator iron-core;

a so-called hybrid type rotor, which is rotatably supported by the stator through a predetermined air gap, having a cylindrical permanent magnet magnetized in a rotation axis direction that is sandwiched between a pair of rotors made from magnetic material each having Nr pieces of pole teeth around the outer circumferential surface thereof at equal pitch and the rotors being arranged such that the pole teeth are deviated with each other, or a permanent magnet type rotor whose cylindrical outer circumferential surface is magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of the respective phases by means of the three-phase twelve-pole construction, further any one harmonic component of the cogging torque among the component from the second harmonic to the third harmonic, the component from the third harmonic to the fourth harmonic and the component from the fourth harmonic to the fifth harmonic is independently erased by making a difference between the small teeth pitch of said stator main pole and the rotor teeth pitch or the pole pair number pitch.

Further, a permanent magnet type twelve-pole stepping motor of an outer rotor type described in claim 4 comprises, a stator comprising a yoke portion having approximately annular shape, a stator iron-core made from magnetic material having twelve stator main poles that are formed on the outer circumferential surface of the yoke portion aligned radially and each having a plurality of small teeth on the tip end thereof, and stator coils wound in the stator iron-core;

a so-called hybrid type rotor, which is rotatably supported by the stator through a predetermined air gap, having a cylindrical permanent magnet magnetized in a rotation axis direction that is sandwiched between a pair of rotors made from magnetic material each having Nr pieces of pole teeth around the inner circumferential surface thereof at equal pitch and the rotors being arranged such that the pole teeth are deviated with each other, or a permanent magnet type rotor whose cylindrical inner circumferential surface is magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of the respective phases by means of the three-phase twelve-pole construction, further any one harmonic component of the cogging torque among the component from the second harmonic to the third harmonic, the component from the third harmonic to the fourth harmonic and the component from the fourth harmonic to the fifth harmonic is independently erased by making a difference between the small teeth pitch of said stator main pole and the rotor teeth pitch or the pole pair number pitch.

Further, a permanent magnet type twelve-pole stepping motor of an inner rotor type or an outer rotor type described in claim 5 is predicated on the claim 1 or 2 and is constructed so that the mechanical deviation angle ($\tau$) between the stator small teeth pitch and the rotor teeth pitch equals to ($\pi/4Nr$) radians to remove the second harmonic component when the number of the small teeth formed on each of the twelve stator main poles equals to four.

Further, a permanent magnet type twelve-pole stepping motor of an inner rotor type or an outer rotor type described in claim 6 is predicated on the claim 1 or 2 and is constructed so that the mechanical deviation angle ($\tau$) between the stator small teeth pitch and the rotor teeth pitch equals to ($\pi/6Nr$) radians to remove the third harmonic component when the number of the small teeth formed on each of the twelve stator main poles equals to four.

Further, a permanent magnet type twelve-pole stepping motor of an inner rotor type or an outer rotor type described in claim 7 is predicated on the claim 1 or 2 and is constructed so that the mechanical deviation angle ($\tau$) between the stator small teeth pitch and the rotor teeth pitch equals to ($\pi/8Nr$) radians to remove the fourth harmonic component when the number of the small teeth formed on each of the twelve stator main poles equals to four.

Further, a permanent magnet type twelve-pole stepping motor of an inner rotor type or an outer rotor type described in claim 8 is predicated on the claim 1 or 2 and is constructed so that the mechanical deviation angle ($\tau$) between the stator small teeth pitch and the rotor teeth pitch equals to ($\pi/10Nr$) radians to remove the fifth harmonic component when the number of the small teeth formed on each of the twelve stator main poles equals to four.

Still further, a permanent magnet type twelve-pole stepping motor of an inner rotor type or an outer rotor type described in claim 9 is predicated on the claim 1 or 2 and is constructed so that the mechanical deviation angle ($\tau$) between the stator small teeth pitch and the rotor teeth pitch ranges from ($\pi/6Nr$) to ($\pi/4Nr$) radians to remove the component from the second harmonic to the third harmonic, or ranges from ($\pi/8Nr$) to ($\pi/6Nr$) radians to remove the component from the third harmonic to the fourth harmonic, or ranges from ($\pi/10Nr$) to ($\pi/8Nr$) radians to remove the component from the fourth harmonic to the fifth harmonic when the number of the small teeth formed on each of the twelve stator main poles equals to four.

The construction as described in claim 1 or 2 allows removing the second harmonic component through the fifth harmonic component by means of the three-phase twelve-pole fundamental construction even if the phase between the pole teeth of the N-pole and the S-pole of the hybrid type rotor is out of order, and further, since any one harmonic component of the field magnet among the second harmonic component, the third harmonic component, the fourth harmonic component and the fifth harmonic component is erased at every stator phase with reliability, the respective harmonic components including the most influential fourth harmonic component as the main component can be erased with reliability, thereby a three-phase hybrid type stepping motor that is usually stable in a rotation characteristic and operates with low oscillation noise can be obtained.

Further, the construction as described in claim 3 or 4 allows removing the second harmonic component through the fifth harmonic component by means of the three-phase twelve-pole fundamental construction, and further, any one harmonic component of the field magnet among the second harmonic component, the third harmonic component, the fourth harmonic component and the fifth harmonic component is relieved at every stator phase.

Still further, the concrete actions of claims 5 through 9 will be described below, they show the functions to remove the second harmonic component through the fifth harmonic component when four small teeth are formed on the stator main pole.

This effect gives a similar effect to the three-phase permanent magnet type other than the hybrid and to the dimensional error of the permanent magnet magnetized on the rotor.

In general, the stator iron-core is manufactured by punching silicon steel plate with a punch press.

Since the phase difference between the magnetic pole formed on the rotor and the stator small teeth is almost determined by the accuracy of a stamping die, the motor that has high accuracy, low cogging torque and low variation can be obtained.

Accordingly, the oscillation and noise with rotation can be extensively reduced.

DESCRIPTION OF THE ACCOMPANYING DRAWINGS

Figure 5:
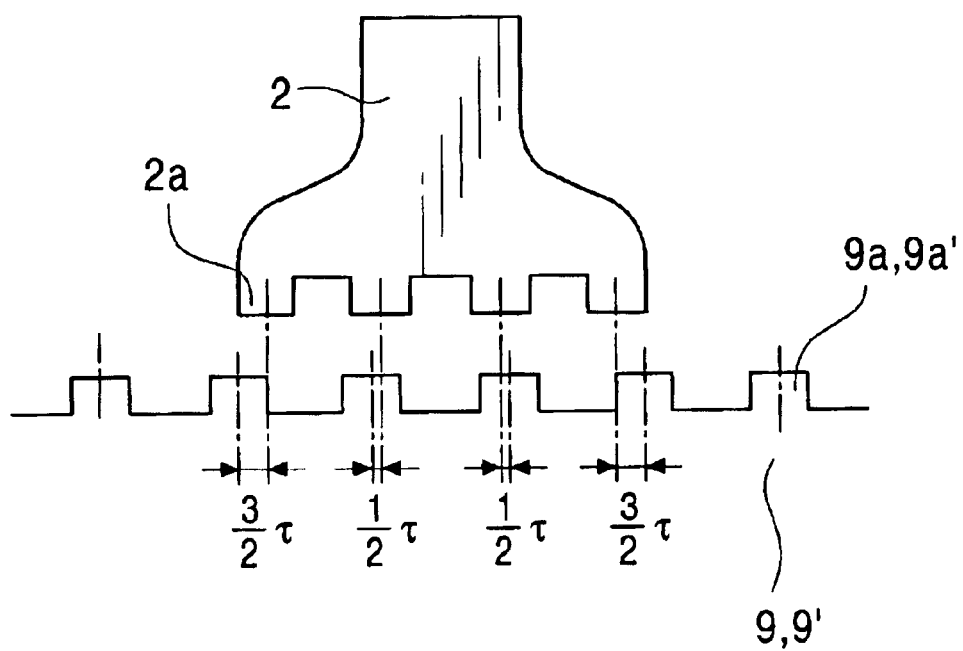

FIG. 4 is a graphic chart showing TABLE describing that the second harmonic component through the fifth harmonic component can be fundamentally removed according to the present invention; and FIG. 5 is a diagram of a phase relationship between small teeth formed on a stator main pole and pole teeth formed on a magnetic pole of a rotor, which is a construction example to remove the third harmonic component and the fourth harmonic component at every phase according to the present invention.

DESCRIPTION OF THE PREFERRED EMBODIMENTS

Figure 1:
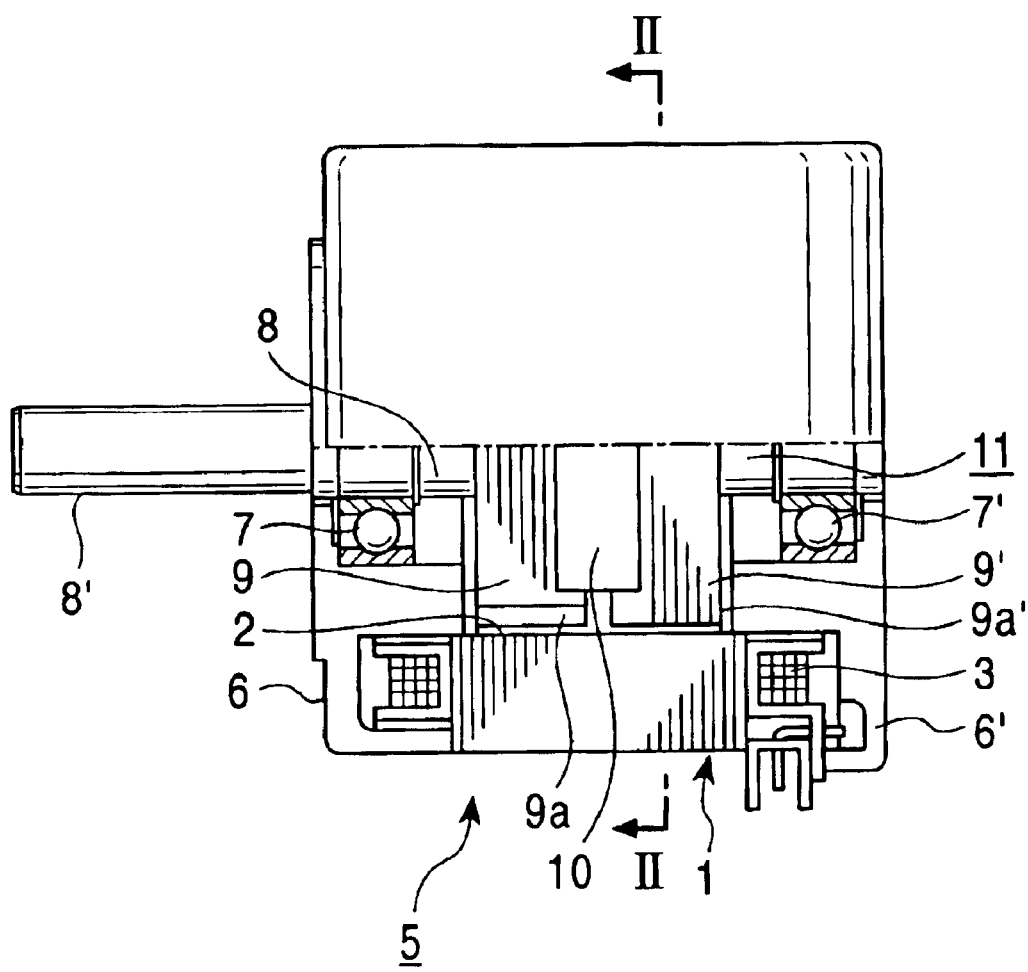
FIG. 1 is a vertically-sectioned side view of a twelve-pole hybrid type stepping motor according to a first embodiment of the present invention.
Figure 2:
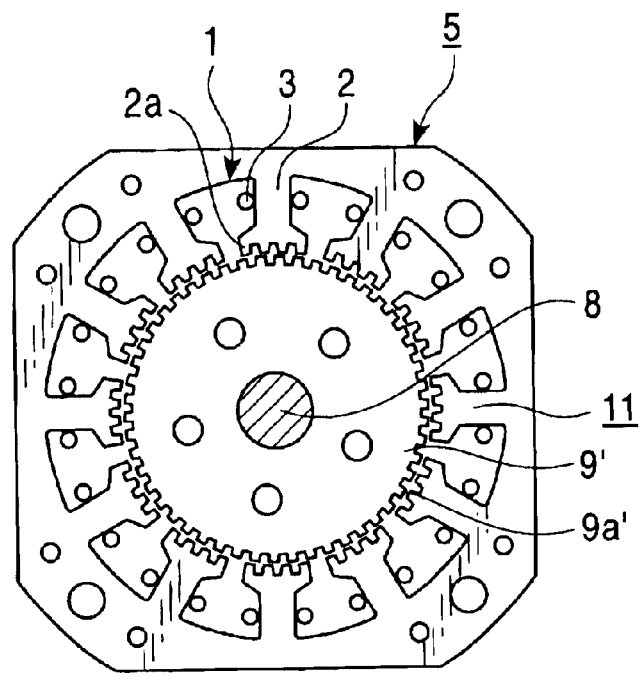
FIG. 2 is a sectional view along II—II of FIG. 1.

Hereinafter, the present invention will be concretely described by an embodiment shown in the drawings.
First Embodiment FIGS. 1 and 2 show the first embodiment of the present invention; FIG. 1 is a vertically-sectioned side view of a three-phase hybrid type stepping motor of an inner rotor type whose stator magnetic pole number is twelve; FIG. 2 is a sectional view along II—II of FIG. 1.

In each of the drawings, 1 is an annular yoke portion, 2 are twelve main poles that are directed from the inner circumferential surface of the annular yoke portion 1 toward the center and each having a plurality of small teeth 2a on the tip end thereof, 3 are stator coils wound in the respective main poles 2.

That is, in the case of the three-phase, the number of the main poles formed on a stator equals to multiples of three such as twelve as described above.

The above-described annular yoke portion 1, the main poles 2 and the stator coils 3 form a stator 5.

The annular yoke portion 1 is fixed by bolts (not shown) that pass through end-brackets 6, 6'.

The end-brackets 6, 6' are supported by a rotation axis 8 through bearings 7, 7' that are located at right and left opposite positions.

A pair of rotor poles 9, 9' each having Nr pieces of pole teeth 9a, 9a' around the outer circumferential surface thereof at equal pitch are fixed to the rotation axis 8 so that the rotor pole teeth 9a, 9a' are deviated by ½ pitch of pole teeth with each other. The rotor poles 9, 9' sandwich a permanent magnet 10 magnetized in a rotation axis direction. Further, 8' is an output axis that is provided at the end portion of the rotation axis 8 and is jutted therefrom.

A rotor 11 is constructed from the two rotor poles 9, 9' fixed to the above-described rotation axis 8 and the permanent magnet 10.

The rotor having the magnetic poles that sandwich the permanent magnet is referred to as a hybrid type rotor, the stepping motor that provides the hybrid type rotor is called a hybrid type stepping motor, and it is abbreviated to a HB type stepping motor in the following description.

The present invention will be described in detail with an example to be applied to a three-phase HB type stepping motor (it is abbreviated to a three-phase machine in the following description).

The three-phase machine that is formed of the stator of multiples of three providing twelve main poles as shown in FIGS. 1 and 2 is superior in a balance of a magnetic path of a field magnet and cost performance among three-phase machines.

Further, as shown in FIG. 1, the embodiment shows the example where the pole teeth number Nr equals to 50.

When Nr=50, a step angle becomes 1.2 degrees.

While the embodiment shows the example of the three-phase machine, the step angle of a two-phase machine becomes 1.8 degrees when Nr=50.

In general, cogging torque of a stepping motor generates from nonuniformity of the air gap and harmonic components of the gap magnetic flux caused by forming the teeth on the stator and the rotor (the small teeth formed on thee stator main pole, the pole teeth formed on the rotor magnetic poles). In the following description, the harmonic components of the gap magnetic flux caused by forming the teeth on the stator and the rotor, which is a leading cause of the cogging torque generation, is analyzed, and the technique of the present invention will be described.

Figure 3:
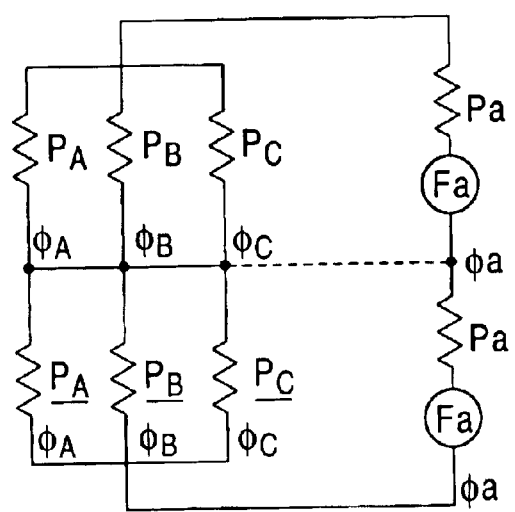
FIG. 3 is a magnetic equivalent circuit diagram of the three-phase machine when the excitation current is zero.

In FIG. 3, a magnetic equivalent circuit of the three-phase machine when the excitation current is not applied to the stator coils is shown.

In FIG. 3, the magnetic fluxes passing through the respective magnetic poles formed by the permanent magnet 10 sandwiched by the rotors are approximated as the following equations (1), (2), (3) under the condition of $3P_0 >> P_m$.

However, definitions of the respective character symbols shown in FIG. 3 and the equations (1) through (3) and equations (4) through (9) described below are follows.
Pm: Permeance of the permanent magnet
Pa: Permeance of the phase A
$F_m$: Magnetomotive force of the permanent magnet
Fa: Magnetomotive force of the phase A
$P_0$: Steady-state value of the permeance
$P_A, P_B, P_C$: Permeances of the phases A, B, C opposite to the rotor N pole, respectively
$\underline{P_A}, \underline{P_B}, \underline{P_C}$: Permeances of the phases A, B, C opposite to the rotor S pole, respectively
$\Phi_A$: Magnetic flux passing through the stator of the phase A
$\Phi_B$: Magnetic flux passing through the stator of the phase B
$\Phi_C$: Magnetic flux passing through the stator of the phase C
$\Phi_a$: The total magnetic flux generated from the rotor $$\Phi_A = (P_m F_m / 3P_0) P_A \quad (1)$$

$$\Phi_B = (P_m F_m / 3P_0) P_B \quad (2)$$

$$\Phi_C = (P_m F_m / 3P_0) P_C \quad (3)$$

Still further, the respective permeances $P_A, P_B, P_C, \underline{P_A}, \underline{P_B}, \underline{P_C}$ are represented as the following equations (4) through (9), where
n: Order of the harmonic,
$K_n$: Constant corresponding to the order of the harmonic,
θ: Phase angle of the stator and the rotor.

$$P_A = P_0 \{1 + \Sigma K_n \cos n(Nr\theta)\} \quad (4)$$

$$P_B = P_0 \{1 + \Sigma K_n \cos n(Nr\theta + 2\pi/3)\} \quad (5)$$

$$P_C = P_0 \{1 + \Sigma K_n \cos n(Nr\theta + 4\pi/3)\} \quad (6)$$

$$\underline{P_A} = P_0 \{1 + \Sigma K_n \cos n(Nr\theta + \pi)\} \quad (7)$$

$$\underline{P_B} = P_0 \{1 + \Sigma K_n \cos n(Nr\theta + \pi + 2\pi/3)\} \quad (8)$$

$$\underline{P_C} = P_0 \{1 + \Sigma K_n \cos n(Nr\theta + \pi + 4\pi/3)\} \quad (9)$$

Accordingly, since the cogging torque $T_A$ of the phase A generated at the opposite portion with respect to the rotor N-pole is obtained as the variation of the magnetic energy in the air gap to the angle, it is shown as the following equation (10).

$$T_A = -(\tfrac{1}{2})d\{\Phi_A{}^2/P_A\}/d\theta = (-NrP_m{}^2F_m{}^2/18P_0)(K_1 \sin Nr\theta + 2K_2 \sin 2Nr\theta + 3K_3 \sin 3Nr\theta + \quad (10)$$

Where, $K_2$, $K_3$ in the above equation are constants corresponding to the order of the harmonics.

Here, while the descriptions beyond the cogging torque $T_A$ of the phase A are omitted, the six cogging torques corresponding to the respective permeances shown in the equations (4) through (9) can be obtained as the cogging torques $T_B$, $T_C$, $T_D$, $T_E$, $T_F$ of the phases B through F in conformance with the equation (10).

By inserting the equations (4) through (9) into the respective equations of the above described (10) and adding the calculation results of the harmonic orders n from 1 to 12, the harmonic component torques of the sixth and twelfth orders only remain, and thereby a logical equation representing the cogging torque of the three-phase machine is obtained as the following equation (11).

$$T = (-2NrP_m{}^2F_m{}^2/P_0)(K_6 \sin 6Nr\theta + 2K_{12} \sin 12Nr\theta + \quad (11)$$

TABLE shown in FIG. 4 is a graphic chart showing one part of the process for deriving the above equation (11), and it shows the sums of $-P_{Di} = -(dP_I/d\theta)$ of the respective harmonic components from i=phase A through phase F with regard to the harmonic components of the permeances of the field magnet flux from n=1 to n=6, that is, from the first order to the sixth order.

Where, $P_{Di}$: Variation component of the respective permeance angle i: Any phase such as the phase A and the phase B As shown in TABLE in FIG. 4, the second harmonic component, the third harmonic component, the fourth harmonic component and the fifth harmonic component of the permeances when n=2, n=3, n=4 and n=5 are canceled by summing the permeances of the respective three phases as shown in the item Σ.

However, when the magnetic balance among the respective phases is out of order or the mechanical positions of the respective stator main poles lack precision, the second harmonic component, the third harmonic component, the fourth harmonic component or the fifth harmonic component will remain without cancellation, which increases the cogging torque.

In general, the low order harmonics such as the third harmonic component and the fourth harmonic component will be a leading cause of an increase of the cogging torque.

Accordingly, even if the balance among the respective phases is collapsed because of the reminder of the second harmonic component, the third harmonic component, the fourth harmonic component or the fifth harmonic component due to the above described cause, when the second harmonic component, the third harmonic component, the fourth harmonic component or the fifth harmonic component is independently erased in the respective phases by means of the appropriate construction of the pitch of the plurality of small teeth formed on the stator main poles for pole-to-pole or phase-to-phase, the cogging torque can decrease.

As described above, when the present invention is applied to the three phase machine, the cogging torque is doubly erased for phase-to-phase and within the each phase, the cogging torque decreases with reliability.

The above description concerns the inner rotor type stepping motor as shown in FIGS. 1 and 2 and it is defined in claim 1. When such a construction is applied to an outer rotor type stepping motor, the stator has the similar construction and the difference is the arrangement of the rotor that is concentrically located at the outside of the stator. Since both sides are identical as a electric rotating machine, the function of the present invention that is proved for the inner rotor type stepping motor is also realized for the outer rotor type stepping motor.

Therefore, the construction of the present invention where the stator described with respect to the inner rotor type stepping motor is applied to the outer rotor type stepping motor is defined in claim 2.

Second Embodiment

Next, the method for independently erasing the third harmonic component and the fourth harmonic component in the respective phases as described above will be described with reference to FIG. 5 that is a constructive example where the main pole has the four small teeth.

FIG. 5 shows any given main pole among the twelve main poles shown in FIGS. 1 and 2, and it shows the relationship between the small teeth and the pole teeth formed on the rotor when the pitch of the small teeth is smaller than the pitch of-the pole teeth by τ, in the mechanical angle, the main pole has the four small teeth and the center of the four small teeth of the stator is coincident with the center of any given tooth groove.

In such a case, the third harmonic component $P_3$ and the fourth harmonic component $P_4$ of the permeance are obtained by the following equations (13) and (14) where the number of the pole teeth of the rotor is Nr.

$$P_3 = 2\{\cos 3(Nr\tau/2) + \cos 3(3Nr\tau/2)\} \quad (13)$$

$$P_4 = 2\{\cos 4(Nr\tau/2) + \cos 4(3Nr\tau/2)\} \quad (14)$$

In the equation (13),
the solution for $P_3 = 0$ is $\tau = \pi/6Nr$.
In the equation (14),
the solution for $P_3 = 0$ is $\tau = \pi/8Nr$.

In the same manner, the second harmonic component $P_2$ and the fifth harmonic component $P_5$ of the permeance are obtained by the following equations (15) and (16) where the number of the pole teeth of the rotor is Nr.

$$P_2 = 2\{\cos 2(Nr\tau/2) + \cos 2(3Nr\tau/2)\} \quad (15)$$

$$P_5 = 2\{\cos 5(Nr\tau/2) + \cos 5(3Nr\tau/2)\} \quad (16)$$

In the equation (15),
the solution for $P_2 = 0$ is $\tau = \pi/4Nr$.
In the equation (16),
the solution for $P_5 = 0$ is $\tau = \pi/10Nr$.

According to the above analysis, the means for removing the second harmonic component, the third harmonic component, the fourth harmonic component and the fifth harmonic component are described in claim 5, claim 6, claim 7 and claim 8, respectively. Further, they can be organized as follows as described in the paragraphs of the summary.

Namely, when the number of the small teeth formed on each of the twelve main poles is four, the following setting of the mechanical deviation angle τ between the stator small teeth pitch and the rotor teeth pitch allows removing the respective harmonic components independently.

(1) $\tau = \pi/4Nr \rightarrow$ The second harmonic component is removed.
(2) $\tau = \pi/6Nr \rightarrow$ The third harmonic component is removed.
(3) $\tau = \pi/8Nr \rightarrow$ The fourth harmonic component is removed.

(4) τ=π/10Nr→ The fifth harmonic component is removed.

The above description concerns the means for independently removing the second harmonic component through the fifth harmonic component, while the means for decreasing the second harmonic component through the fifth harmonic component to the practical level may be taken as follows. That is, the mechanical deviation angle (τ) between the stator small teeth pitch and the rotor teeth pitch may range from (π/6Nr) to (π/4Nr) radians to remove the component from the second harmonic to the third harmonic, or may range from (π/8Nr) to (π/6Nr) radians to remove the component from the third harmonic to the fourth harmonic, or may range from (π/10Nr) to (π/8Nr) radians to remove the component from the fourth harmonic to the fifth harmonic.

Namely, this means is described in claim 9 and in the paragraphs of the summary.

As described above, the second harmonic component $P_2$ and the fifth harmonic component $P_5$ of the permeance can be described as the equations (15) and (16).

$$P_2=2\{\cos 2(Nr\tau/2)+\cos 2(3Nr\tau/2)\} \quad (15)$$

$$P_5=2\{\cos 5(Nr\tau/2)+\cos 5(3Nr\tau/2)\} \quad (16)$$

Further, the third harmonic component $P_3$ and the fourth harmonic component $P_4$ of the permeance can be described as the equations (13) and (14) as described above.

$$P_3=2\{\cos 3(Nr\tau/2)+\cos 3(3Nr\tau/2)\} \quad (13)$$

$$P_4=2\{\cos 4(Nr\tau/2)+\cos 4(3Nr\tau/2)\} \quad (14)$$

Assuming that the values of τ for letting the second harmonic component, the third harmonic component, the fourth harmonic component and the fifth harmonic component of the permeance to zero are represented by $\tau_2$, $\tau_3$, $\tau_4$, and $\tau_5$, which are obtained by letting the left sides of the equations (15), (13), (14) and (16) to zero, it can counter the intermediate harmonic component between the respective harmonic components as follows.

That is, when τ satisfies the condition $\tau_3<\tau<\tau_2$, the component from the second harmonic to the third harmonic can be removed.

When τ satisfies the condition $\tau_4<\tau<\tau_3$, the component from the third harmonic to the fourth harmonic can be removed.

Further, when τ satisfies the condition $\tau_5<\tau<\tau_4$, the component from the fourth harmonic to the fifth harmonic can be removed.

The constructions in which these conditions are applied to a permanent magnet type twelve-pole stepping motor of an outer rotor type and a permanent magnet type twelve-pole stepping motor of an inner rotor type are described in claims 3 and 4.

Further, the stepping motor having the hybrid type rotor is principally described in the above described first and second embodiments, while the same technical philosophy can be applied to a stepping motor having a permanent magnet type rotor as a matter of course.

Effects of the Invention

Since the stepping motor of the present invention is constructed as above, it has excellent effects as follows.

1. The three-phase twelve-pole construction as described in claims 1 and 2 removes the second harmonic component, the third harmonic component, the fourth harmonic component and the fifth harmonic component because the cogging torques of the respective phases of the three phase stepping motor of the inner rotor type or the outer rotor type are composed.

Further, any one harmonic component of the cogging torque among the second harmonic component, the third harmonic component, the fourth harmonic component and the fifth harmonic component is independently erased by making a difference between the small teeth pitch of said stator main pole and the rotor teeth pitch or the pole pair number pitch, thereby any one harmonic component among the second harmonic component, the third harmonic component, the fourth harmonic component and the fifth harmonic component is doubly erased.

Accordingly, the cogging torque is reduced with reliability without increasing accuracy of elements of the stator and the rotor.

2. The three-phase twelve-pole construction as described in claims 3 and 4 removes the second harmonic component, the third harmonic component, the fourth harmonic component and the fifth harmonic component because the cogging torques of the respective phases of the three phase stepping motor of the inner rotor type or the outer rotor type are composed.

Further, any one harmonic component of the cogging torque among the component from the second harmonic to the third harmonic, the component from the third harmonic to the fourth harmonic and the component from the fourth harmonic to the fifth harmonic is independently erased by making a difference between the small teeth pitch of said stator main pole and the rotor teeth pitch or the pole pair number pitch, thereby any one harmonic component of the field magnet among the second harmonic component, the third harmonic component, the fourth harmonic component and the fifth harmonic component is relieved to the practicable level at every stator phase.

3. Further, the construction described in claim 5 can independently erase the second harmonic component in each phase when four small teeth are formed on the stator main pole. Therefore, when the harmonic component other than the second harmonic component is emphasized in the construction of claim 1 or 2 for instance, the harmonic components including the second harmonic component can be doubly erased.

4. Further, the construction described in claim 6 can independently erase the third harmonic component in each phase when four small teeth are formed on the stator main pole. Therefore, when the harmonic component other than the third harmonic component is emphasized in the construction of claim 1 or 2 for instance, the harmonic components including the third harmonic component can be doubly erased.

5. Further, the construction described in claim 7 can independently erase the fourth harmonic component in each phase when four small teeth are formed on the stator main pole. Therefore, when the harmonic component other than the fourth harmonic component is emphasized in the construction of claim 1 or 2 for instance, the harmonic components including the fourth harmonic component can be doubly erased.

6. Further, the construction described in claim 8 can independently erase the fifth harmonic component in each phase when four small teeth are formed on the stator main pole. Therefore, when the harmonic component other than the fifth harmonic component is emphasized in the construction of claim 1 or 2 for instance, the harmonic components including the fifth harmonic component can be doubly erased.

7. Further, the construction described in claim 9 can independently erase the component from the second harmonic to the third harmonic, the component from the third harmonic to the fourth harmonic and the component from the fourth harmonic to the fifth harmonic in each phase when four small teeth are formed on the stator main pole. Therefore, the second harmonic component through the fifth harmonic component are relieved to the practicable level in the construction of claim 1 or 2 for instance.

What is claimed is:

1. A permanent magnet type twelve-pole stepping motor of an inner rotor type, comprising:

a stator comprising a yoke portion having substantially annular shape, a stator iron-core comprising magnetic material having twelve stator main poles that are directed from the inner circumferential surface of the yoke portion toward the center and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the outer circumferential surface thereof at an equal pitch and the rotors being arranged such that the pole teeth are deviated with each other, and a permanent magnet type rotor having a cylindrical outer circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and a mechanical deviation angle ($\tau$) between a pitch of the four small teeth in the stator and a pitch of teeth in the hybrid type rotor and permanent magnetic type rotor equals to ($\pi/4Nr$) radians so as to independently erase the second harmonic component, thereby the second harmonic component is doubly erased.

2. A permanent magnet type twelve-pole stepping motor of an outer rotor type, comprising:

a stator comprising a yoke portion having substantially annular shape, a stator iron-core comprising magnetic material having twelve stator main poles that are formed on the outer circumferential surface of the yoke portion aligned radially and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the inner circumferential surface thereof at an equal pitch and the rotors being arranged such that the pole teeth are deviated with each other, and a permanent magnet type rotor having a cylindrical inner circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and a mechanical deviation angle ($\tau$) between a pitch of the four small teeth in the stator and a pitch of teeth in the hybrid type rotor and permanent magnetic type rotor equals to ($\pi/4Nr$) radians so as to independently erase the second harmonic component, thereby the second harmonic component is doubly erased.

3. A permanent magnet type twelve-pole stepping motor of an inner rotor type, comprising:

a stator comprising a yoke portion having substantially annular shape, a stator iron-core comprising magnetic material having twelve stator main poles that are directed from the inner circumferential surface of the yoke portion toward the center and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the outer circumferential surface thereof at an equal pitch and the rotors being arranged such that the pole teeth are deviated with each other, and a permanent magnet type rotor having a cylindrical outer circumferential surface is magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and a mechanical deviation angle ($\tau$) between a pitch of the four small teeth in the stator and a pitch of teeth in the hybrid type rotor and permanent magnetic type rotor is one of a range from ($\pi/6Nr$) to ($\pi/4Nr$) radians to remove a component from the second harmonic component to the third harmonic component, a range from ($\pi/8Nr$) to ($\pi/6Nr$) radians to remove a component from the third harmonic component to the fourth harmonic component, and a range from ($\pi/10Nr$) to ($\pi/8Nr$) radians to remove a component from the fourth harmonic component to the fifth harmonic component.

4. A permanent magnet type twelve-pole stepping motor of an outer rotor type, comprising:

a stator comprising a yoke portion having substantially annular shape, a stator iron-core comprising magnetic material having twelve stator main poles that are formed on the outer circumferential surface of the yoke portion aligned radially and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the inner circumferential surface thereof at an equal pitch and the rotors being arranged such that the pole teeth are deviated with each other, and a permanent magnet type rotor having a cylindrical inner circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and a mechanical deviation angle (τ) between a pitch of the four small teeth in the stator and a pitch of teeth in the hybrid type rotor and permanent magnetic type rotor is one of a range from ($\pi/6Nr$) to ($\pi/4Nr$) radians to remove a component from the second harmonic component to the third harmonic component, a range from ($\pi/8Nr$) to ($\pi/6Nr$) radians to remove a component from the third harmonic component to the fourth harmonic component, and a range from ($\pi/10Nr$) to ($\pi/8Nr$) radians to remove a component from the fourth harmonic component to the fifth harmonic component.

5. A permanent magnet type twelve-pole stepping motor of an inner rotor type, comprising:

a stator comprising a yoke portion having substantially annular shape, a stator iron-core comprising magnetic material having twelve stator main poles that are directed from the inner circumferential surface of the yoke portion toward the center and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the outer circumferential surface thereof at an equal pitch and the rotors being arranged such that the pole teeth are deviated with each other, and a permanent magnet type rotor having a cylindrical outer circumferential surface magnetized in a direction parallel to the rotation axis to form Nr pairs of N-pole and S-pole alternately;

wherein said stator is fanned as three-phase winding and second harmonic component, third harmonic component, fourth harmonic component and fifth harmonic component are removed by composing cogging torque of respective phases by a three-phase twelve-pole construction, a mechanical deviation angle (τ) between a pitch of the four small teeth in the stator and a pitch of teeth in the hybrid type rotor and permanent magnetic type rotor equals to ($\pi/6Nr$) radians to remove the third harmonic component.

6. A permanent magnet type twelve-pole stepping motor of an inner rotor type, comprising:

a stator comprising a yoke portion having substantially annular shape, a stator iron-core comprising magnetic material having twelve stator main poles that are directed from the inner circumferential surface of the yoke portion toward the center and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the outer circumferential surface thereof at an equal pitch and the rotors being arranged such that the pole teeth are deviated with each other, and a permanent magnet type rotor having a cylindrical outer circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, a mechanical deviation angle (τ) between a pitch of the four small teeth in the stator a pitch of teeth in the hybrid type rotor and permanent magnetic type rotor equals to ($\pi/8Nr$) radians to remove the fourth harmonic component.

7. A permanent magnet type twelve-pole stepping motor of an inner rotor type, comprising:

a stator comprising a yoke portion having substantially annular shape, a stator iron-core comprising magnetic material having twelve stator main poles that are directed from the inner circumferential surface of the yoke portion toward the center and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the outer circumferential surface thereof at an equal pitch and the rotors being arranged such that the pole teeth are deviated with each other, and a permanent magnet type rotor having a cylindrical outer circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, a mechanical deviation angle (τ) between a pitch of the four small teeth in the stator a pitch of teeth in the hybrid type rotor and permanent magnetic type rotor equals to ($\pi/10Nr$) radians to remove the fifth harmonic component.

8. A permanent magnet type twelve-pole stepping motor of an outer rotor type, comprising:

a stator comprising a yoke portion having substantially annular shape, a stator iron-core comprising magnetic material having twelve stator main poles that are formed on the outer circumferential surface of the yoke portion aligned radially and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the inner circumferential surface thereof at an equal pitch and the rotors being arranged such that the pole teeth are deviated with each other, and a permanent magnet type rotor having a cylindrical inner circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and a mechanical deviation angle ($\tau$) between a pitch of the four small teeth in the stator and a pitch of teeth in the hybrid type rotor and permanent magnetic type rotor equals to ($\pi/6Nr$) radians to independently erase the third harmonic component, thereby the third harmonic component is doubly erased.

9. A permanent magnet type twelve-pole stepping motor of an outer rotor type, comprising:

a stator comprising a yoke portion having substantially annular shape, a stator iron-core comprising magnetic material having twelve stator main poles that are formed on the outer circumferential surface of the yoke portion aligned radially and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the inner circumferential surface thereof at an equal pitch and the rotors being arranged such that the pole teeth are deviated with each other, and a permanent magnet type rotor having a cylindrical inner circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and a mechanical deviation angle ($\tau$) between a pitch of the four small teeth in the stator and a pitch of teeth in the hybrid type rotor and permanent magnetic type rotor equals to ($\pi/8Nr$) radians to independently erase the fourth harmonic component, thereby the fourth harmonic component is doubly erased.

10. A permanent magnet type twelve-pole stepping motor of an outer rotor type, comprising:

a stator comprising a yoke portion having substantially annular shape, a stator iron-core comprising magnetic material having twelve stator main poles that are formed on the outer circumferential surface of the yoke portion aligned radially and each having four small teeth on the tip end thereof, and stator coils wound in the stator iron-core; and one of a hybrid type rotor rotatably supported by the stator through a predetermined air gap, having a cylindrical permanent magnet magnetized in a rotation axis direction that is sandwiched between a pair of rotors comprising magnetic material each having Nr pieces of pole teeth around the inner circumferential surface thereof at an equal pitch and the rotors being arranged such that the pole teeth are deviated with each other, and a permanent magnet type rotor having a cylindrical inner circumferential surface magnetized in a direction parallel to the rotation axis to form Nr pairs of N-pole and S-pole alternately;

wherein said stator is formed as three-phase winding and second harmonic component, third harmonic component, fourth harmonic component and fifth harmonic component are removed by composing cogging torque of respective phases by a three-phase twelve-pole construction, and the mechanical deviation angle ($\tau$) between a mechanical deviation angle ($\tau$) between a pitch of the four small teeth in the stator and a pitch of teeth in the hybrid type rotor and permanent magnetic type rotor equals to ($\pi/10Nr$) radians to independently erase the fifth harmonic component, thereby the fifth harmonic component is doubly erased.

* * * * *

UNITED STATES PATENT AND TRADEMARK OFFICE
CERTIFICATE OF CORRECTION

PATENT NO. : 6,707,178 B2
DATED : March 16, 2004
INVENTOR(S) : Sakamoto et al.

It is certified that error appears in the above-identified patent and that said Letters Patent is hereby corrected as shown below:

<u>Title page,</u>
Items [*] and [45], should read
-- [*]   Notice: Subject to any disclaimer, the term of this patent is extended or adjusted under 35 U.S.C. 154(b) by 0 days.

This patent is subject to a terminal disclaimer.

[45]   Date of Patent:  *Mar. 16, 2004 --

Signed and Sealed this

Twelfth Day of April, 2005

JON W. DUDAS
*Director of the United States Patent and Trademark Office*